(No Model.)

C. J. HAFEY.
LID LIFTING ATTACHMENT FOR KETTLES.

No. 491,552. Patented Feb. 14, 1893.

Witnesses
W. O. Schneider
N. T. Riley

Inventor
C. J. Hafey.

By his Attorneys,
C. A. Snow & Co.

UNITED STATES PATENT OFFICE.

CUTHBERT J. HAFEY, OF EUREKA, KANSAS.

LID-LIFTING ATTACHMENT FOR KETTLES.

SPECIFICATION forming part of Letters Patent No. 491,552, dated February 14, 1893.

Application filed October 14, 1892. Serial No. 448,878. (No model.)

*To all whom it may concern:*

Be it known that I, CUTHBERT J. HAFEY, a citizen of the United States, residing at Eureka, in the county of Greenwood and State of Kansas, have invented a new and useful Lid-Lifting Attachment for Kettles, of which the following is a specification.

The invention relates to improvements in kettles.

The object of the present invention is to provide for kettles and similar vessels a lid lifting attachment which will enable the lid of a kettle to be readily raised and lowered when it is desired to fill or gain access to the interior of the kettle, without liability of burning or scalding the hand, or allowing the lid to fall heavily on the body of the kettle.

The invention consists in the construction and novel combination and arrangement of parts hereinafter fully described, illustrated in the accompanying drawings and pointed out in the claims hereto appended.

Figure 1:
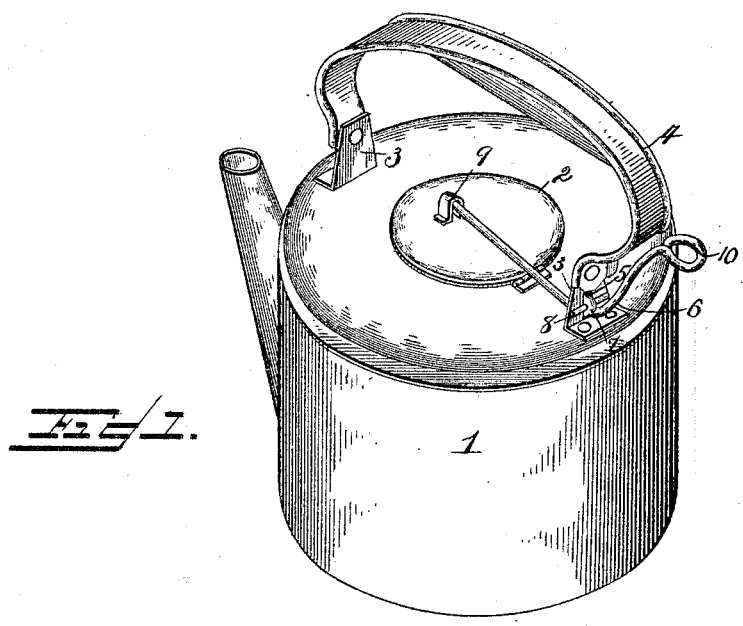
Figure 2:
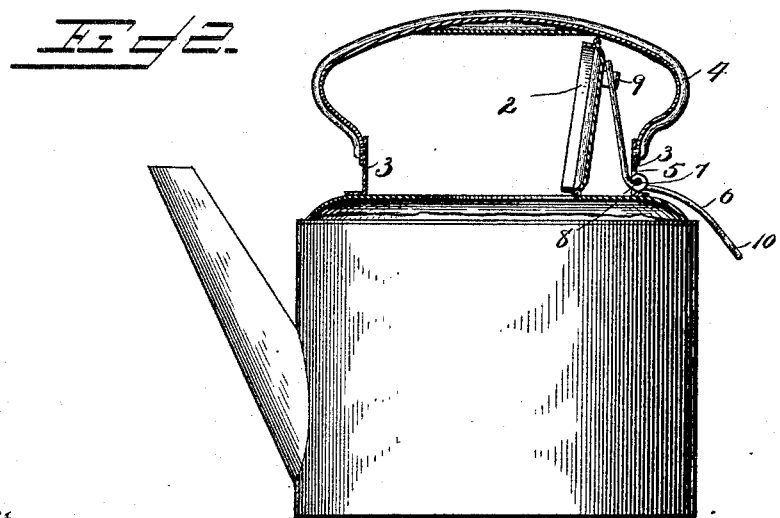

In the drawings—Figure 1 is a perspective view of a kettle provided with a lid lifting attachment constructed in accordance with this invention. Fig. 2 is a vertical sectional view showing the lid raised.

Like numerals of reference indicate corresponding parts in both figures of the drawings.

1 designates the body of a kettle having a hinged lid 2 and provided at diametrical opposit points at the sides of the lid opening with ears 3 to which are hinged a bail 4. One of the ears is provided with a vertical slot 5 through which passes a lever 6 constructed of wire and provided intermediate its ends with an eye 7 formed by coiling the wire and hinged to the slotted ear by a horizontal pintle rod 8 secured to the bail and extending across the same and spanning the slot and passing through the eye of the lever. The inner portion or arm of the lever is arranged in a loop 9 of the lid, and the outer portion or arm is curved upward and provided with a thumb loop 10 and forms a handle. The outer arm of the lever is adapted to be depressed to raise the lid, and there is no liability of a hand being burned or scalded by steam arising from the kettle.

It will be seen that the lid lifting attachment is simple and inexpensive in construction, is strong and durable, that it may be readily applied to a vessel having a hinged lid, and that a lid may be raised and lowered without liability of injuring the hand by burning, and without liability of allowing the lid to fall heavily on the body of the vessel.

What I claim is—

1. The combination with a vessel, and a lid hinged to the same, of a lever fulcrumed intermediate of its ends in rear of the hinge of the lid and having one end connected with the lid and its other end forming a handle, substantially as described.

2. The combination with a vessel having a hinged lid provided with a loop, ears secured to the vessel at opposite sides of the lid, one of the ears being slotted, and a pintle secured to the slotted ear and extending across the slot, of a lever provided intermediate of its ends with an eye and passing through the slot and receiving the pintle in its eye and having its inner portion loosely fitting in said loop and having its outer portion extending upward and forming a handle, substantially as described.

In testimony that I claim the foregoing as my own I have hereto affixed my signature in the presence of two witnesses.

CUTHBERT J. HAFEY.

Witnesses:
J. M. HAFEY,
H. A. DALES.